(12) United States Patent
Legner

(10) Patent No.: US 10,280,854 B2
(45) Date of Patent: May 7, 2019

(54) METHOD FOR OPERATING A DRIVE TRAIN FOR A MOBILE VEHICLE

(71) Applicant: ZF Friedrichshafen AG, Friedrichshafen (DE)

(72) Inventor: Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 71 days.

(21) Appl. No.: 15/586,511

(22) Filed: May 4, 2017

(65) Prior Publication Data

US 2017/0370312 A1    Dec. 28, 2017

(30) Foreign Application Priority Data

Jun. 28, 2016    (DE) .......................... 10 2016 211 635

(51) Int. Cl.
| | |
|---|---|
| *F02D 41/02* | (2006.01) |
| *B60W 30/19* | (2012.01) |
| *B60W 10/06* | (2006.01) |
| *B60W 10/11* | (2012.01) |
| *F16H 63/50* | (2006.01) |
| *F02D 41/12* | (2006.01) |
| *F02D 31/00* | (2006.01) |

(52) U.S. Cl.
CPC .......... *F02D 41/023* (2013.01); *B60W 10/06* (2013.01); *B60W 10/11* (2013.01); *B60W 30/19* (2013.01); *F02D 41/12* (2013.01); *F16H 63/502* (2013.01); *F02D 31/006* (2013.01); *F02D 31/009* (2013.01); *F02D 2200/602* (2013.01); *F02D 2250/21* (2013.01)

(58) Field of Classification Search
CPC .... F02D 41/023; F16H 63/502; B60W 30/19; B60W 10/06; B60W 10/11
See application file for complete search history.

(56) References Cited

U.S. PATENT DOCUMENTS

| | | | |
|---|---|---|---|
| 5,382,205 A | 1/1995 | Togai et al. | |
| 5,476,425 A * | 12/1995 | Shiraishi | ............... B60W 10/06 477/109 |
| 5,580,331 A | 12/1996 | Shiraishi et al. | |
| 6,459,979 B2 * | 10/2002 | Murakami | ............ B60W 10/06 701/52 |
| 8,942,899 B1 | 1/2015 | Spohn et al. | |
| 9,975,556 B2 * | 5/2018 | Kuwahara | ............... F16H 3/663 |

FOREIGN PATENT DOCUMENTS

| | | |
|---|---|---|
| DE | 43 34 928 A1 | 4/1994 |
| DE | 692 06 720 T2 | 6/1996 |
| DE | 10 2014 111 730 A1 | 2/2015 |
| WO | WO-2016001745 A1 * | 1/2016 ............. F16H 3/663 |

OTHER PUBLICATIONS

German Search Report Corresponding to 10 2016 211 635.5 dated Mar. 15, 2017.

* cited by examiner

*Primary Examiner* — Erin D Bishop
(74) *Attorney, Agent, or Firm* — Davis & Bujold PLLC; Michael J. Bujold

(57) ABSTRACT

With a torque-controlled internal combustion engine and a variable-speed transmission having fixed shift gear ratios, during a shift, the internal combustion engine is controlled in such manner that the drive output torque of the transmission remains the same before and after the shift.

8 Claims, 3 Drawing Sheets

METHOD FOR OPERATING A DRIVE TRAIN FOR A MOBILE VEHICLE

This application claims priority from German patent application serial no. 10 2016 211 635.5 filed Jun. 28, 2016.

FIELD OF THE INVENTION

The invention relates to a method for operating a drive-train of a mobile vehicle.

BACKGROUND OF THE INVENTION

Methods of this type are used in working machines such as dumpers with a shiftable transmission having a number of fixed gear ratios and an internal combustion engine. The internal combustion engine can be rotational-speed-regulated, which means that at each fixed position of the accelerator pedal the internal combustion engine is controlled in such manner that it operates at a constant rotational speed, and the possibility exists of operating the internal combustion engine in a torque-controlled manner, this in turn meaning that at a fixed accelerator position the internal combustion engine is controlled in such manner that regardless of the rotational speed it delivers a constant torque.

However when the working machine, in particular the dumper, is operated with a torque-controlled internal combustion engine, then particularly at a high torque and when an upshift is carried out, the problem of shift shock occurs, since the necessary torque after the shift would have to be increased by the factor of the gear ratio change of the transmission during the shift. But since the internal combustion engine is controlled in such manner that the drive output torque remains almost constant, the shifting point for downshifting is reached again directly after the upshift, and this leads to an immediate downshift.

SUMMARY OF THE INVENTION

The purpose of the present invention is to provide a method for operating a drive-train of a mobile vehicle, in particular a dumper, with a shiftable transmission having fixed gear ratios and a torque-regulated internal combustion engine, which method can be operated comfortably without the risk of shift shocks.

This objective is achieved with a method of the type concerned which also comprises the features of the principal claim.

According to the invention, during a shift from a first gear ratio to a second gear ratio of the variable-speed transmission of the drive-train the internal combustion engine, which is operated under torque control, is controlled in such manner that the torque of the internal combustion engine during a downshift is reduced by the factor of the gear ratio change in the variable-speed transmission and during an upshift it is increased by the factor of the gear ratio change during the shift, so that the torque delivered by the internal combustion engine multiplied by the gear ratio of the transmission before the shift is equal to the drive output torque of the internal combustion engine multiplied by the gear ratio of the transmission after the shift. If a torque converter is present, during this it is regarded as closed, i.e. bridged. Since during the upshift the torque of the internal combustion engine is increased by the factor of the gear ratio change, the drive output torque applied to the vehicle wheels is the same before and after the shift, so that shifting shock is prevented effectively and the vehicle does not immediately downshift again. If the transmission has several gears, the torque is in each case adapted to the gear interval concerned.

In a further design form of the invention, as a function of the accelerator pedal position, in addition to the torque regulation of the internal combustion engine the maximum rotational speed of the internal combustion engine is limited. Thus, for each accelerator pedal position a maximum value of the rotational speed is predetermined. This makes the speed control of the vehicle by way of the accelerator pedal more plausible, since otherwise driving situations could occur in which with the accelerator pedal unchanged the torque is maintained even when moving downhill, which results in a permanent rotational speed increase and thus to acceleration of the vehicle, leading to driving behavior incomprehensible to the driver. But since the maximum rotational speed of the internal combustion engine is limited as a function of the accelerator pedal position, the driver can also influence the speed of the vehicle downhill by reducing the accelerator pedal position.

If in addition the vehicle has a retarder, then the retarder or the braking torque produced by the retarder is controlled as a function of the accelerator pedal position. This makes it possible, for example when driving downhill, to brake the vehicle without operating the service brakes but instead by virtue of the retarder, exclusively by reducing the actuation of the accelerator pedal. The more the accelerator pedal or its actuation is reduced, the greater is the braking torque produced by the retarder.

In a further design form of the invention the minimum rotational speed of the internal combustion engine is also influenced as a function of the accelerator pedal position, so that for example when starting off, the internal combustion engine does not fall below its required minimum rotational speed, which would stop the engine, this also being known as stalling.

By controlling the internal combustion engine in accordance with the method according to the invention the working machine, for example the dumper, can be operated with outstanding driving behavior, which increases its productivity. In particular, the shifting frequency is reduced, shifting oscillations are very largely prevented and driving safety when driving downhill is improved thanks to the automatic actuation of the retarder as a function of the accelerator pedal position. The regulation of downhill speed is also improved by virtue of the accelerator pedal.

BRIEF DESCRIPTION OF THE DRAWINGS

Further characteristics emerge from the description of the figures, which show.

DETAILED DESCRIPTION OF THE PREFERRED EMBODIMENTS

FIG. 1:

The drive output torque of the internal combustion engine is plotted along the ordinate and the drive output rotational speed is plotted along the abscissa.

The line 1 represents the maximum possible torque curve of the internal combustion engine. Since the internal combustion engine torque is regulated, without the method according to the invention the internal combustion engine would be operated for example along the line 2 or the line 3 depending on the position of the accelerator pedal. In that case, when operating along line 2 the accelerator pedal would be pressed down harder than when operating along line 3. The line 4 is the upshift line at which the variable-speed transmission with the fixed shift gear ratio stages is upshifted. The line 5 is the shift line at which the transmission with the fixed gear ratios is downshifted. If now the vehicle is operated using the accelerator pedal, with which the internal combustion engine is torque-regulated along the line 2, and the vehicle reaches the shifting point 6, then an upshift takes place by the gear ratio of the gear to be changed, for example 1.4. Since due to the inertial mass the driving speed, i.e. the drive output rotational speed of the transmission hardly changes, both the rotational speed and also the torque required change by the factor of the gear ratio change, in this case by the factor 1.4. The change of torque and rotational speed during the shift is represented by the line 7. If the vehicle were now to be operated further with constant torque regulation along the line 2 whereas, however, the torque increases along the line 7 due to the shift of the transmission, then the vehicle would immediately reach the line 5 for downshifting and a downshift would immediately take place again. This would produce the so-termed shifting shock. Now however, according to the invention the internal combustion engine in its torque regulation is controlled in such manner that during the shift the torque is increased sufficiently for the torque increase to equal the gear ratio change during the upshift. Thus, the torque changes along the line 7. Consequently the drive output shaft of the transmission has the same torque after the shift as it had before the shift. This reliably prevents shifting shock. The lines 8 and 9 show upshifts at other positions of the accelerator pedal.

Figure 1:
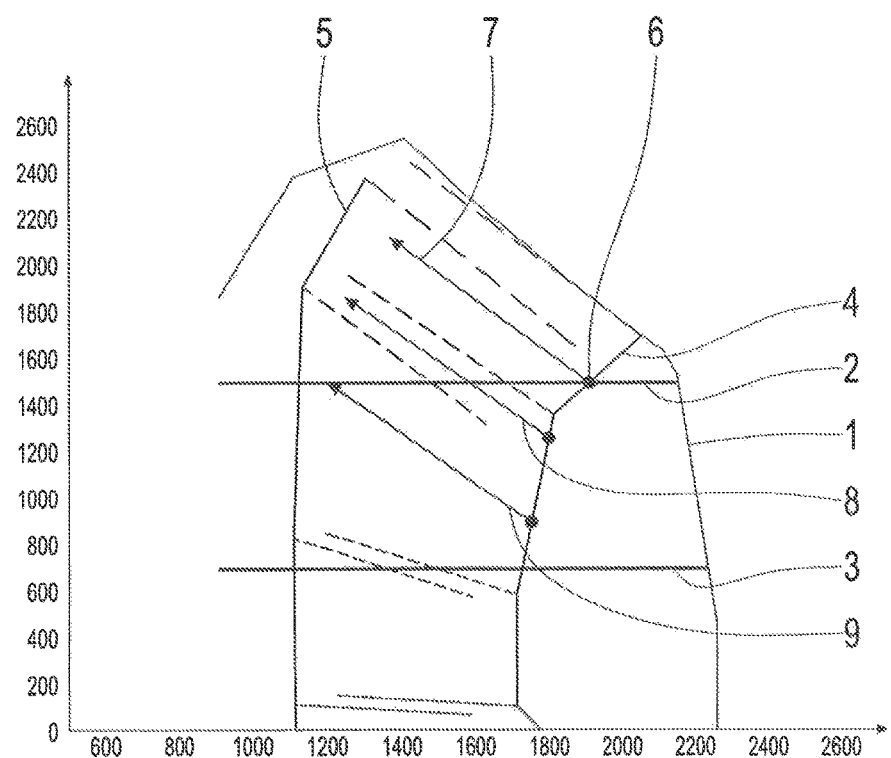
FIG. 1: A rotational speed-torque diagram of a torque-regulated internal combustion engine.
Figure 2:
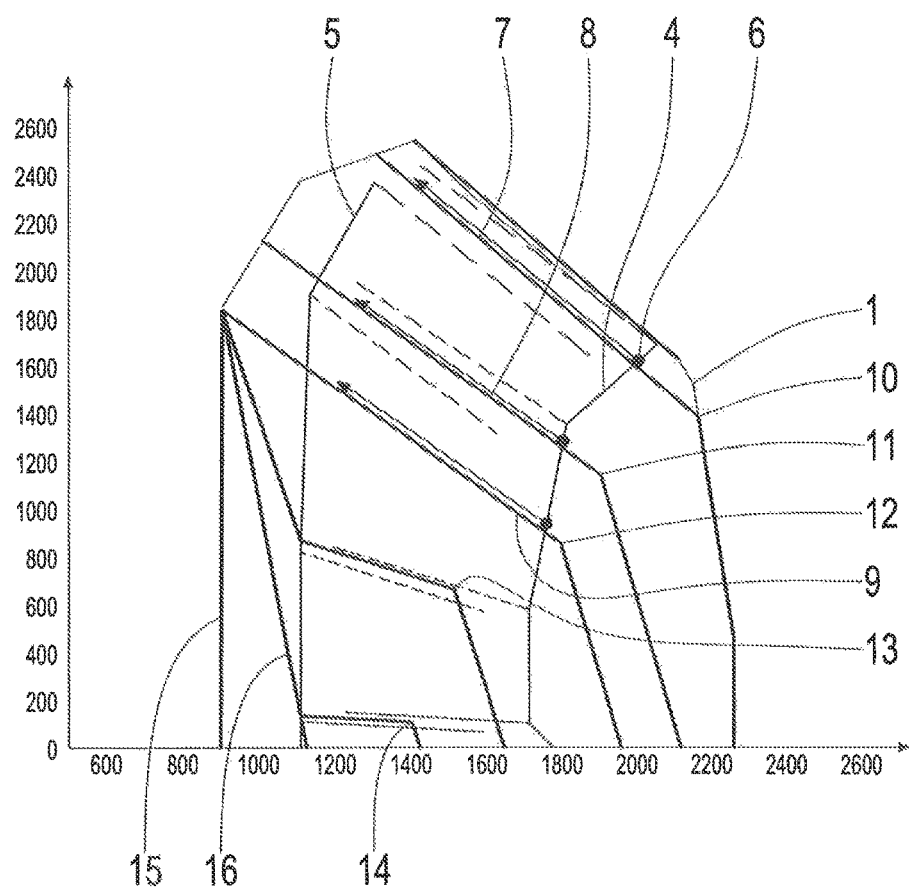
FIG. 2: A rotational speed-torque diagram of a torque-regulated internal combustion engine with limited maximum and minimum rotational speeds.
Figure 3:
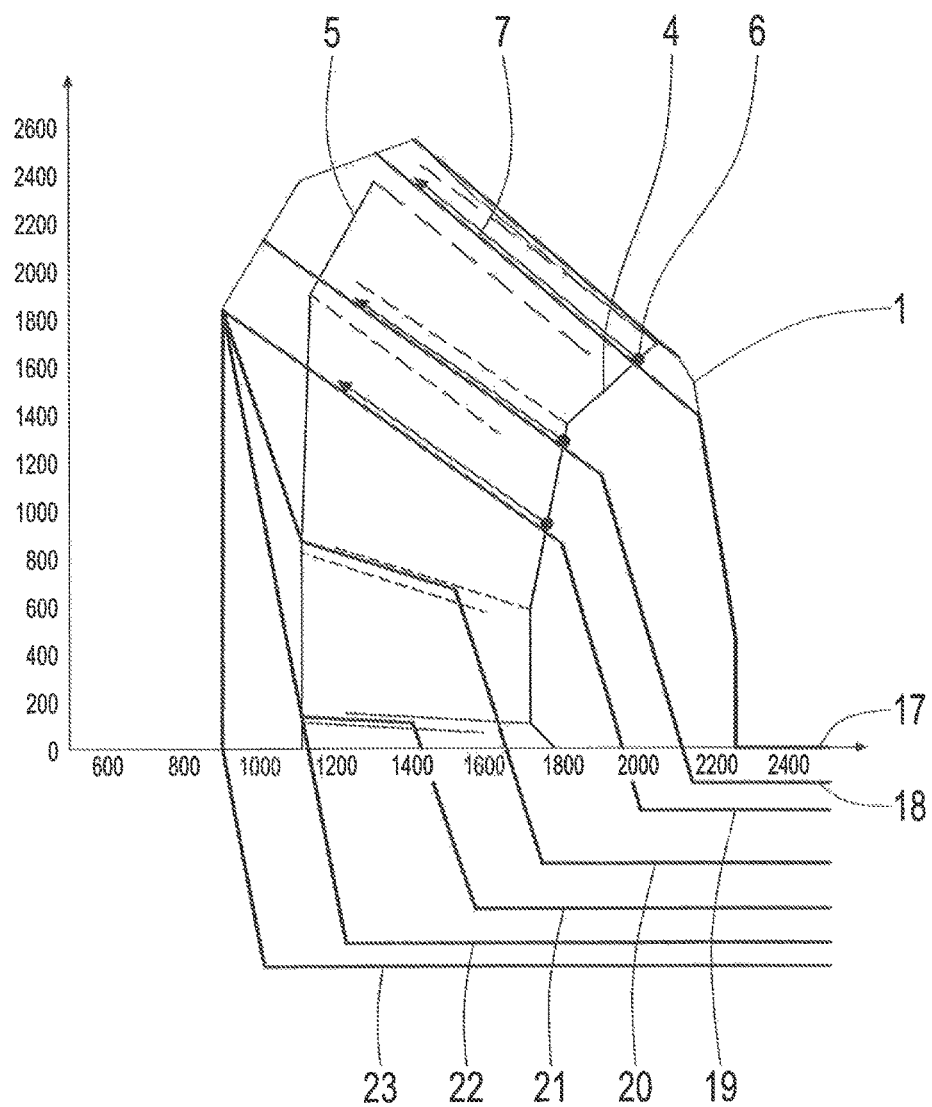
FIG. 3: A rotational speed-torque diagram of a torque-regulated internal combustion engine with limited maximum and minimum rotational speeds, also showing the retarder braking torque.

FIG. 2:

Along the ordinate is plotted the torque, whereas the rotational speed of the internal combustion engine is plotted along the abscissa. For torque adaptation during the shift by the factor of the gear ratio change of the transmission, FIG. 2 also shows the limitation of the maximum rotational speed, which begins for example from the limitation point 10, 11, 12, 13 and 14. For example, if the vehicle drives over a crest and the vehicle were to have no maximum rotational speed limitation of the internal combustion engine, then after the crest the vehicle would accelerate sharply and not reach the overdrive operating condition. By limiting the maximum rotational speed, for example above the limiting point 11, the vehicle can be brought to overdrive operation so that the vehicle is braked by the internal combustion engine, whereby a driving sense is conveyed to the driver that he can slow the vehicle down by means of the accelerator pedal. To prevent the vehicle from stalling when starting off, the vehicle is operated along the lines 15 and 16.

FIG. 3:

Along the ordinate is plotted the torque, whereas the rotational speed of the internal combustion engine is plotted along the abscissa. In addition, the braking torque from the retarder is shown along the negative extension of the ordinate. The course of the lines in the positive zone of the ordinate corresponds to the representation if FIG. 2. In addition, as a function of the accelerator pedal a braking torque is produced by the retarder, which is shown along the lines 17, 18, 19, 20, 21, 22 and 23. The more the accelerator pedal actuation is reduced, the greater is the braking action of the retarder.

INDEXES

1 Line
2 Line
3 Line
4 Line
5 Line
6 Shifting point
7 Line
8 Line
9 Line
10 Limiting point
11 Limiting point
12 Limiting point
13 Limiting point
14 Limiting point
15 Line
16 Line
17 Line
18 Line
19 Line
20 Line
21 Line
22 Line
23 Line

The invention claimed is:

1. A method of operating a drive-train of a mobile vehicle with an internal combustion engine and a transmission having at least shiftable first and second fixed gear ratios for powering a driving operation such that, when the transmission is shifted, the transmission shifts from the first fixed gear ratio to the second fixed gear ratio, the method comprising:
   controlling the internal combustion engine with an electronic control unit so that the internal combustion engine is operated in a torque-controlled manner as a function of a position of an accelerator pedal;
   during the shift from the first fixed gear ratio to the second fixed gear ratio, and with the accelerator pedal position unchanged, the electronic control unit controls torque of the internal combustion engine as a function of a gear ratio change in such a manner that the torque of the internal combustion engine is either increased or reduced such that delivered torque of the transmission remains the same; and
   maintaining the torque of the internal combustion engine during the shift if a rotational speed of the internal combustion engine is below a predefined value before the shift.

2. The method of operating the drive-train according to claim 1, further comprising, defining the shift as a downshift; and
   during the downshift, reducing the torque delivered by the internal combustion engine by a factor of the gear ratio change.

3. The method of operating the drive-train according to claim 1, further comprising, defining the shift as an upshift; and
during the upshift, increasing the torque delivered by the internal combustion engine by a factor of the gear ratio change.

4. The method of operating the drive-train according to claim 1, further comprising limiting a maximum rotational speed that is reachable by the internal combustion engine as a function of the position of the accelerator pedal, and the limited rotational speed is lower than a theoretically possible rotational speed of the internal combustion engine.

5. A method of operating a drive-train of a mobile vehicle with an internal combustion engine and a transmission having at least shiftable first and second fixed gear ratios for powering a driving operation such that, when the transmission is shifted, the transmission shifts from the first fixed gear ratio to the second fixed gear ratio, the method comprising:
controlling the internal combustion engine with an electronic control unit so that the internal combustion engine is operated in a torque-controlled manner as a function of a position of an accelerator pedal;
during the shift from the first fixed gear ratio to the second fixed gear ratio, and with the accelerator pedal position unchanged, the electronic control unit controls torque of the internal combustion engine as a function of a gear ratio change in such a manner that the torque of the internal combustion engine is either increased or reduced such that delivered torque of the transmission remains the same;
limiting a maximum rotational speed that is reachable by the internal combustion engine as a function of the position of the accelerator pedal, and the limited maximum rotational speed is lower than a theoretically possible rotational speed of the internal combustion engine; and
limiting the maximum rotation speed of the internal combustion engine in such a manner that the internal combustion engine brakes the vehicle when the accelerator pedal position is set below a predefined value.

6. The method of operating the drive-train according to claim 5, further comprising additionally actuating a retarder when the accelerator pedal position is set below a predefined value.

7. The method of operating the drive-train according to claim 6, further comprising controlling the torque produced by the retarder as a function of the accelerator pedal position.

8. A method of operating a drive-train of a mobile vehicle with an internal combustion engine and a transmission having at least first and second fixed gear ratios that are shiftable for powering a driving operation, the method comprising:
initiating a transmission gear shift from the first fixed gear ratio to the second fixed gear ratio;
controlling a torque of the internal combustion engine with an electronic control unit as a function of a position of an accelerator pedal;
during the transmission gear shift from the first fixed gear ratio to the second gear ratio, and when the position of the accelerator pedal is unchanged, controlling the torque of the internal combustion engine with the electronic control unit as a function of a gear ratio change such that the torque of the internal combustion engine is either increased or reduced to maintain torque output by the transmission unchanged during the transmission gear shift from the first fixed gear ratio to the second gear ratio; and
maintaining the torque of the internal combustion engine during the transmission gear shift, if a rotational speed of the internal combustion engine is below a predefined value before the shift.

* * * * *